United States Patent [19]

Schallhorn et al.

[11] 4,148,200

[45] Apr. 10, 1979

[54] TORSIONAL VIBRATION DAMPER FOR A LOCK-UP CLUTCH

[75] Inventors: Thomas L. Schallhorn, Highland; John M. Beardmore, South Lyon, both of Mich.

[73] Assignee: General Motors Corporation, Detroit, Mich.

[21] Appl. No.: 912,519

[22] Filed: Jun. 5, 1978

[51] Int. Cl.² .................. F16D 3/14; F16D 47/02
[52] U.S. Cl. ............................ 64/27 C; 64/27 R; 192/106.1; 192/106.2
[58] Field of Search ................ 64/27 C, 27 R; 192/106.1, 106.2, 107

[56] References Cited

U.S. PATENT DOCUMENTS

| Re. 22,635 | 4/1945 | Thelander | 192/106.2 |
| 1,359,848 | 11/1920 | Techel | 64/27 C |
| 2,316,820 | 4/1943 | Thelander | 192/106.2 |
| 2,337,134 | 12/1943 | Thelander | 192/106.2 |
| 2,342,989 | 2/1944 | Ware | 64/27 C |
| 2,513,379 | 7/1950 | Thelander | 192/106.2 |
| 2,569,503 | 10/1951 | Thelander | 64/27 R |
| 4,093,054 | 6/1978 | Johns | 192/106.1 |

FOREIGN PATENT DOCUMENTS

| 851872 | 7/1949 | Fed. Rep. of Germany | 64/27 C |
| 2528774 | 1/1976 | Fed. Rep. of Germany | 64/27 R |

Primary Examiner—Charles J. Myhre
Assistant Examiner—R. C. Turner
Attorney, Agent, or Firm—Donald F. Scherer

[57] ABSTRACT

A torsional vibration damper for a torque converter lock-up clutch having viscous and spring-damping characteristics during the initial relative movement between the input and output members of the clutch and a spring-damping characteristic during further relative movement. Viscous damping can also be provided during the further relative movement, if desired.

4 Claims, 4 Drawing Figures

TORSIONAL VIBRATION DAMPER FOR A LOCK-UP CLUTCH

This invention relates to vibration dampers and more particularly to viscous damping of torsional vibrations.

It is an object of this invention to provide an improved viscous damper for torsional vibration damping.

It is another object of this invention to provide an improved torsional vibration damper wherein the initial damping phase is accomplished by a piston and cylinder for viscous damping and a spring for mechanical damping, and wherein the final damping phase is accomplished by another spring after the piston has bottomed in the cylinder.

A further object of this invention is to provide an improved torsional damper disposed between the input and output members of a torque converter lock-up clutch and having a piston slidably disposed in the cylinder and drivingly connected to a plunger through a lost motion one-way driving connection to provide viscous damping when the piston moves relative to the cylinder and also having one spring means which provides damping during a viscous damping portion and another spring means which provides damping in parallel with the one spring means when the plunger moves relative to the piston.

These and other objects and advantages of the present invention will be more apparent from the following description and drawings in which.

Figure 1:
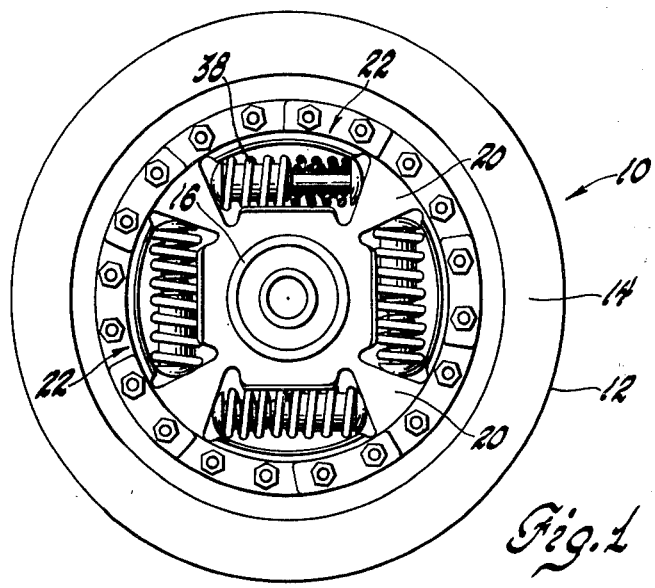
FIG. 1 is an elevational view of a clutch and damper assembly.

Referring to the drawings, there is shown in FIG. 1, a clutch assembly, generally designated 10, having a clutch plate input member 12 with a frictional surface 14 bonded thereto, and an output member 16. The clutch plate 12 has a plurality of spokes 18, such as that shown in FIG. 3, which spokes 18 are aligned with similar spokes 20 formed on the output member 16, such as those shown in FIG. 2. The spokes 18 and 20 have formed therebetween recesses or openings in which are disposed vibration dampers, generally designated 22. In FIG. 1, it is seen that four equally spaced vibration dampers 22 are utilized between the input member 12 and the output member 16 of the clutch assembly 10.

Figure 2:
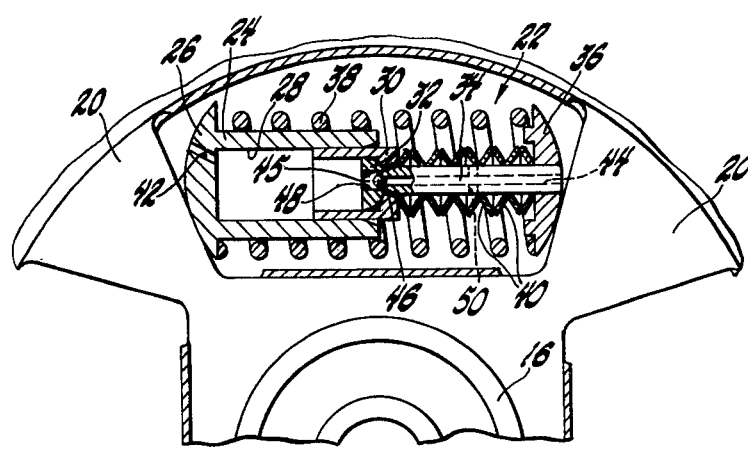
FIG. 2 is an enlarged view partly in section of the damper shown in the "at rest" position.
Figure 4:
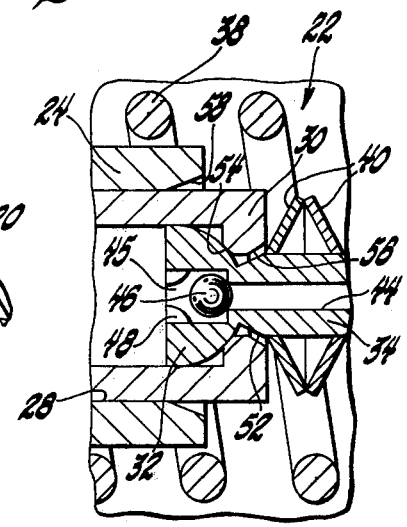
FIG. 4 is an enlarged cross sectional view of a portion of the damper.

The vibration dampers 22 include a cylinder portion 24 which has a rounded end portion 26 which abuts the spokes 18 and 20 in the "at rest" position shown in FIG. 2. The cylinder portion 24 has a bore 28 in which is slidably disposed a piston 30. The piston 30 has slidably disposed therein a spherically shaped head 32 of a plunger 34. The plunger 34 has a rounded end portion 36 which abuts the spokes 18 and 20 when the damper is in the "at rest" position. The rounded portion 36 of plunger 34 and rounded portion 26 of cylinder 24 are urged apart by a coil spring 38 to maintain abutting relationship between the damper 22 and the spokes 18 and 20. The piston 30 is urged into abutting relationship with the spherical head 32 of the plunger 34 by a plurality of Belleville springs 40 which are compressed between the portion 36 of plunger 34 and the piston 30.

The rounded portion 26 of cylinder 24 has a restricted passage 42 formed therein which communicates with the bore 28 of cylinder 24. The plunger 34 has an axially extending passage 44 formed therein which is in fluid communication with the space between spokes 20. The spherical head 32 of plunger 34 has an opening 45 in which is disposed a ball 46 having freedom of movement to act as a check valve to control the admission of fluid through passage 44 to bore 28 as will be explained later. The ball 46 is larger than the passage 44. The opening 45 has material deformed therein, such as at 48, which prevents the ball 46 from leaving the plunger 34 in a lefthand direction, as viewed in FIG. 2, but provides sufficient opening to permit the free passage of fluid through passage 44 around ball 46 into bore 28 of cylinder 24. A cross channel 50 is drilled in plunger 34 intersecting the axially extending passage 44.

The clutch and damper assemblies are preferably used in a torque converter lock-up clutch such as that shown in U.S. Pat. No. 3,252,352 to General, et al., issued May 24, 1966. Therefore, the recesses, containing dampers 22, are filled with hydraulic fluid so that fluid is available for the viscous damping operation.

Figure 3:
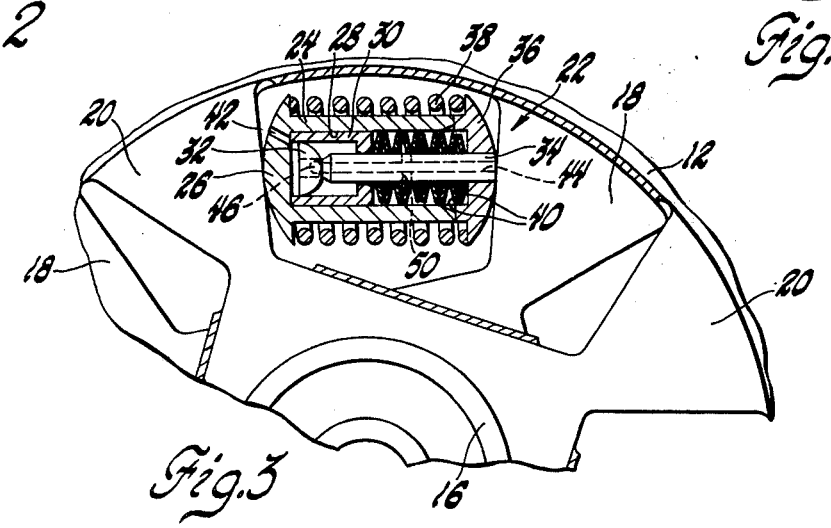
FIG. 3 is a view, similar to FIG. 2, with the damper in the fully actuated position.

When the clutch is engaged, the input member 12, and therefore spokes 18, will move relative to the output member 16, and therefore spokes 20, as can be seen in FIG. 3, where full movement has occurred. During the initial relative movement, between the spokes 18 and 20, the spring 38 is compressed and the plunger 34 through Belleville springs 40 causes the piston 30 to be moved in the cylinder bore 28 thereby forcing fluid out of restriction 42. During this portion of movement, the ball 46 is seated in passage 44 to prevent fluid from moving through passage 44 and cross channel 50. During this portion of the movement in damper 22, both viscous and spring damping occur.

After a predetermined amount of movement, the piston 30 will bottom in bore 28 such that further relative movement between the spokes 18 and 20 causes compression of the Belleville springs 40 and movement of the plunger 34 relative to the piston 30. The spherical end 32 of plunger 34 is preferably sized to have sufficient clearance between the inner surface of piston 30 and the spherical end 32 such that the free passage of fluid between the piston 30 and plunger 34 is permitted. It is, however, possible to design the clearance between these parts such that continued viscous damping can occur. It is also possible to design the stem portion of plunger 34 such that the fluid is moved within the inner cavity of the piston 30 from one side of the spherical end 32 to the other. Thus, the second or final phase of damping can be controlled to be either solely spring-damping or a combination of spring and viscous damping. Also, by controlling these clearances, it is possible to eliminate the restriction 42 in cylinder 24 so that all of the fluid movement during viscous damping passes through the clearances.

The relative movement spokes 18 and 20 occurs because of the torsional vibrations which are transmitted by the engine to the transmission. It is, of course, recognized that these torsional vibrations require relative movement in both directions, that is, clockwise and counterclockwise, between the spokes 18 and 20.

The above description was directed toward that phase when spokes 18 are moving counterclockwise relative to spokes 20 as viewed in FIGS. 2 and 3. As the spokes 18 move clockwise relative to spokes 20, the ball 46 is moved against the displaced material 48 to admit fluid freely into the bore 28 of cylinder 24. Thus, the fluid returning to fill the bore 28 does not have to pass solely through restriction 42. Therefore, the bore 28 can be filled more rapidly than it can be exhausted.

Since the relative movement between plunger 34 and piston 30 or cylinder 24 will, at times, be angular, the plunger 34 has a tapered portion 52 adjacent the spherical end 32, which cooperates with tapered portions 54 and 56 formed on the piston 30, to permit relative angular movement between the plunger 34 and piston 30. A taper 58 is formed on the cylinder 24 to maintain clearance between the plunger 34 and cylinder 24 when relative angular movement occurs.

The damping characteristics can be readily controlled by controlling the spring rate constants in springs 38 and 40 and by controlling the size of the restriction 42. Thus, the initial damping phase can assume a slope or characteristic that is different than the final damping phase by judicious selection of the spring rate constants in the Belleville springs 40 and coil springs 38. It is also possible to use a coil spring in place of Belleville springs 40.

The duration of the viscous damping phase can be controlled by judiciously selecting the length of piston 30 such that the bottoming of piston 30 in bore 28 can be selected to provide the desired amount of viscous damping between the input and output members of the clutch. While not shown, the dampers 22 can be enclosed on one side by sheet metal components to prevent the free passage of fluid from one side of the clutch to the other when used as a lock-up clutch in a torque converter. This will permit the fluid pressure within the torque converter to engage the clutch as shown in the above-mentioned General et al patent. The damper will also provide damping in a more conventional type clutch, such as that used with synchromesh transmissions, provided the clutch space is filled with hydraulic fluid. These types of so-called wet-clutches are well-known in the art.

Obviously, many modifications and variations are possible in light of the above teaching. It is, therefore, to be understood that within the scope of the appended claims, the invention may be practiced otherwise than as specifically described.

The embodiments of the invention in which an exclusive property or privilege is claimed are defined as follows:

1. A vibration damper disposed within a torque converter containing hydraulic fluid comprising; an input member; an output member; a fluid cylinder abutting one of said members and having a flow restriction formed therein; a plunger abutting the other of said members, said plunger having a passage communicating with said fluid cylinder and valve means for permitting fluid flow through said passage in one direction only; first spring means disposed between said plunger and said fluid cylinder for urging said plunger and said fluid cylinder respectively into abutting relation with said members and for permitting relative movement between said plunger and said fluid cylinder when relative movement occurs between the input and output members; a piston slidably disposed in said fluid cylinder and having a lost motion one-way driving connection with said plunger and movable therewith to expand and contract the volume in said cylinder when relative movement occurs; and second spring means for moving said piston and plunger in unison during initial relative movement between said plunger and said fluid cylinder whereby fluid is pumped through said restriction and for permitting relative movement between said plunger and piston after a predetermined amount of relative movement between said plunger and cylinder, said valve means being operative to prevent fluid flow when said plunger and piston are moving in a direction to contract the volume in said cylinder and to permit fluid flow to said cylinder when said plunger and piston are moving in a direction to expand the volume in said cylinder.

2. A vibration damper disposed within a housing containing hydraulic fluid comprising; an input member; an output member; a fluid cylinder abutting one of said members and having a flow restriction formed therein; a plunger abutting the other of said members, said plunger having an enlarged head and a longitudinal passage communicating with said fluid cylinder and ball valve means disposed in said passage in said enlarged head end for permitting fluid flow through said passage in one direction only; first spring means disposed between said plunger and said fluid cylinder for urging said plunger and said fluid cylinder respectively into abutting relation with said members and for permitting relative movement between said plunger and said fluid cylinder when relative movement occurs between the input and output members; a piston slidably disposed in said fluid cylinder and having a lost motion one-way driving connection with said enlarged head end of said plunger and movable therewith to expand the volume in said cylinder when relative movement occurs in one direction; and second spring means cooperating with said enlarged head end for moving said piston and plunger in unison during initial relative movement between said plunger and said fluid cylinder in another direction whereby fluid is pumped through said restriction and for permitting relative movement between said plunger and piston after a predetermined amount of relative movement between said plunger and cylinder, said valve means being operative to prevent fluid flow when said plunger and piston are moving in said other direction to contract the volume in said cylinder and to permit fluid flow to said cylinder when said plunger and piston are moving in said one direction to expand the volume in said cylinder.

3. A vibration damper disposed within a torque converter containing hydraulic fluid comprising; an input member having radially disposed spaced spokes; an output member having radially disposed spaced spokes cooperating with said spokes on said input member to form a plurality of openings; a fluid cylinder having rounded end means for abutting the spokes of said input and output members abutting one of said members and having a flow restriction formed therein and being disposed in the openings formed by said spokes; a plunger abutting the other of said members, said plunger disposed in said openings formed by said spokes and having a passage communicating with said fluid cylinder, ball valve means for permitting fluid flow through said passage in one direction only and rounded end means for abutting the spokes of said input and output members; first spring means disposed between the rounded end means of said plunger and said fluid cylinder for urging said plunger and said fluid cylinder respectively into abutting relation with said spokes of said input and output members and for permitting relative movement between said plunger and said fluid cylinder when relative movement occurs between the input and output members; a piston slidably disosed in said fluid cylinder and having a lost motion one-way driving connection with said plunger and movable therewith to expand and contract the volume in said cylinder when relative movement occurs; and second spring means for moving said piston and plunger in unison during initial relative movement between said plunger and said fluid cylinder whereby fluid is pumped through said restriction and for permitting relative movement between said plunger and piston after a predetermined amount of relative movement between said plunger and cylinder, said valve means being operative to prevent fluid flow when said plunger and piston are moving in a direction to contract the volume in said cylinder and to permit fluid flow to said cylinder when said plunger and piston are moving in a direction to expand the volume in said cylinder.

4. A vibration damper disposed within a housing containing hydraulic fluid comprising; an input member; an output member; a fluid cylinder movable with one of said members; a plunger movable with the other of said members, said plunger having a passage communicating with said fluid cylinder and valve means for permitting fluid flow through said passage in one direction only; first spring means disposed between said plunger and said fluid cylinder for urging said plunger and said fluid cylinder respectively toward said members and for permitting relative movement between said plunger and said fluid cylinder when relative movement occurs between the input and output members; a piston slidably disposed in said fluid cylinder and having a lost motion one-way driving connection with said plunger and movable therewith to expand and contract the volume in said cylinder when relative movement occurs; flow restriction means for controlling fluid flow out of said cylinder; and second spring means for moving said piston and plunger in unison during initial relative movement between said plunger and said fluid cylinder whereby fluid is pumped through said flow restriction means and for permitting relative movement between said plunger and piston after a predetermined amount of relative movement between said plunger and cylinder, said valve means being operative to prevent fluid flow when said plunger and piston are moving in a direction to contract the volume in said cylinder and to permit fluid flow to said cylinder when said plunger and piston are moving in a direction to expand the volume in said cylinder.

* * * * *